(12) United States Patent
Börjesson

(10) Patent No.: US 8,010,129 B2
(45) Date of Patent: Aug. 30, 2011

(54) DEVICE AND METHOD FOR GENERATING AN ALERT SIGNAL

(75) Inventor: Henrik Börjesson, Lund (SE)

(73) Assignee: Sony Ericsson Mobile Communications AB Lund (SE)

( * ) Notice: Subject to any disclaimer, the term of this patent is extended or adjusted under 35 U.S.C. 154(b) by 1596 days.

(21) Appl. No.: 10/534,139

(22) PCT Filed: Nov. 7, 2003

(86) PCT No.: PCT/EP03/12482
§ 371 (c)(1), (2), (4) Date: May 6, 2005

(87) PCT Pub. No.: WO2004/043100
PCT Pub. Date: May 21, 2004

(65) Prior Publication Data
US 2006/0121912 A1    Jun. 8, 2006

Related U.S. Application Data

(60) Provisional application No. 60/427,440, filed on Nov. 19, 2002.

(30) Foreign Application Priority Data

Nov. 7, 2002 (EP) ..................... 02445147

(51) Int. Cl.
*H04W 24/00* (2009.01)
*H04M 3/00* (2006.01)

(52) U.S. Cl. .................. 455/456.3; 455/412.2; 455/418

(58) Field of Classification Search ............... 455/412.2, 455/418, 456.1–457; 701/200–215; 342/450, 342/357.01, 357.06–357.08; 340/988–996
See application file for complete search history.

(56) References Cited

U.S. PATENT DOCUMENTS

| | | | | |
|---|---|---|---|---|
| 5,598,166 A | * | 1/1997 | Ishikawa et al. | 342/357.06 |
| 5,938,721 A | * | 8/1999 | Dussell et al. | 701/211 |
| 6,317,593 B1 | * | 11/2001 | Vossler | 455/414.1 |
| 6,785,552 B2 | * | 8/2004 | Shinozaki et al. | 455/456.1 |

(Continued)

FOREIGN PATENT DOCUMENTS

CN    1348575 A    5/2002

(Continued)

OTHER PUBLICATIONS

International Search Report dated Apr. 16, 2004 for corresponding PCT application No. PCT/EP2003/012482.

(Continued)

*Primary Examiner* — George Eng
*Assistant Examiner* — Marcos L Torres
(74) *Attorney, Agent, or Firm* — Myers Bigel Sibley & Sajovec, P.A.

(57) ABSTRACT

An alert signal is generated based on the geographical position of a device and/or based on time or date. The alert signal is generated when the device is within a certain distance from a predefined location. An actual position of the device, the location of a place of interest, and a request for an alert signal associated with the location of the place of interest are stored. The actual position of the device is compared with the location of the place of interest. The alert signal is generated when the distance between the actual position of the device and the location of a place of interest is less than a predetermined value.

26 Claims, 1 Drawing Sheet

Town

Building

District

U.S. PATENT DOCUMENTS

| | | | |
|---|---|---|---|
| 6,799,049 B1 * | 9/2004 | Zellner et al. | 455/456.1 |
| 6,950,663 B2 * | 9/2005 | Pihl et al. | 455/456.5 |
| 2001/0005171 A1 | 6/2001 | Farringdon et al. | |
| 2002/0013153 A1 | 1/2002 | Wilcock et al. | |
| 2002/0068583 A1 | 6/2002 | Murray | |
| 2002/0164995 A1 | 11/2002 | Brown et al. | |

FOREIGN PATENT DOCUMENTS

| | | |
|---|---|---|
| EP | 1199899 A1 | 4/2002 |
| JP | 2000311145 | 11/2000 |
| WO | WO 01/58201 | 8/2001 |
| WO | WO 02/058426 A1 | 7/2002 |
| WO | WO 02/076118 A1 | 9/2002 |
| WO | WO 02/076118 A1 | 9/2002 |
| WO | WO 02/076136 A1 | 9/2002 |

OTHER PUBLICATIONS

Communication Pursuant to Article 96(2) EPC for European Patent Application No. 02445147.8 completed on Sep. 30, 2005.

First Chinese Office Action (6 pages) corresponding to Chinese Patent Application No. 200380102583.9; Issue Date: Aug. 8, 2008.

English Translation of the First Chinese Office Action (13 pages) corresponding to Chinese Patent Application No. 200380102583.9; Issue Date: Aug. 8, 2008.

* cited by examiner

DEVICE AND METHOD FOR GENERATING
AN ALERT SIGNAL

RELATED APPLICATIONS

The present application is a 35 U.S.C. §371 national phase application of PCT International Application No. PCT/EP2003/012482, having an international filing date of Nov. 7, 2003, and claiming priority to European Patent Application No. 02445147.8, filed Nov. 7, 2002, and U.S. Provisional Application No. 60/427,440, filed Nov. 19, 2002, the disclosures of which are incorporated herein by reference in their entireties. The above PCT International Application was published in the English language and has International Publication No. WO 2004/043100 A1.

FIELD OF THE INVENTION

The present invention relates to a device and method for generating an alert signal based on the geographical position of the device, optionally also based on time or date. The alert signal is generated when the device is within a certain distance from a predefined location taking into account the fact that certain tasks or actions can only be taken when the user is at this location. The device is suitably a mobile telephone.

STATE OF THE ART

It is well known to use time-based calendars in portable devices such as mobile telephones. Reminders are presented on the device when the actual time matches a calendar event previously entered by the user in the calendar. Also, positioning services are well known such as GPS (Global Positioning System) and various positioning services in mobile telecommunication networks. The standard positioning services usually give position and in same case suggestions for nearby gas stations, shops, cinemas, etc.

The problem today is that the time based calendar function only refers to time instances. For some tasks you will only be able to perform them at a specific location, sometimes regardless of time. Having an ordinary "to-do list" is neither an option because you cannot check this list at every time instance and every time you visit a new place.

SUMMARY OF THE INVENTION

The invention exploits the novel idea that one should be able to set a calendar event but not solely based on a certain time but rather on position. This means that whenever you are close to a certain location you will be reminded by the calendar event. In fact, some "calendar" events are triggered regardless of time since they only depend on location.

In a first aspect the invention provides a device for generating an alert signal comprising:
positioning means for updating and storing an actual position of the device;
location storage means for storing the location of a place of interest;
means for storing a request for an alert signal associated with the location of a place of interest; and
trigger means for comparing the actual position of the device with the location of a place of interest and triggering generation of said alert signal when the distance between the actual position of the device and the location of a place of interest is less than a predetermined value.

Preferably, the predetermined value is variable, and may be set individually for each request for an alert signal.

Suitably, the location storage means includes a personal map program and/or a browser for finding locations on a telecommunications network.

The browser may be a WAP browser for finding locations on the Internet.

In one embodiment, the positioning means is arranged to update the actual position of the device every time the device changes base station and/or at regular time intervals.

In another embodiment, the positioning means is arranged to update the actual position of the device every time the device the device has moved a distance, for instance 100 meters.

In still another embodiment the positioning means is arranged to update the actual position of the device in dependence of the speed of the device.

In a further embodiment, the device comprises:
calendar means for storing calendar entries;
clock means for keeping track of the actual time;
further trigger means for comparing the actual time with a calendar entry and triggering generation of said alert signal when the actual time matches the calendar entry, but only when the distance between the actual position of the device and the location of a place of interest is less than the predetermined value.

Suitably, the calendar entry matches the actual time once only or the calendar entry matches the actual time repeatedly for a specified time unit, such as day/week/month/year.

The positioning means may comprise a GPS receiver.

The device may be a portable telephone, a pager, a communicator, a smart phone, a positioning device or an electronic organiser.

In a second aspect the invention provides a method for generating an alert signal in
a device comprising the steps of:
updating and storing an actual position of the device;
storing the location of a place of interest; storing a request for an alert signal associated with the location of a place of interest; and
comparing the actual position of the device with the location of a place of interest and triggering generation of said alert signal when the distance between the actual position of the device and the location of a place of interest is less than a predetermined value.

Preferably, the predetermined value is variable, and is set individually for each request for an alert signal.

Suitably, the location storage is supplied by means of a personal map program and/or by means of a browser for finding locations on a telecommunications network.

The browser may be a WAP browser for finding locations on the Internet.

In one embodiment, the actual position of the device is updated every time the device changes base station and/or at regular time intervals.

In another embodiment, the actual position of the device is updated every time the device the device has moved a distance, for instance 100 meters.

In still another embodiment the actual position of the device is updated in dependence of the speed of the device.

In a further embodiment, the method comprises the steps of:
storing calendar entries;
keeping track of the actual time;
comparing the actual time with a calendar entry and triggering generation of said alert signal when the actual time matches the calendar entry, but only when the distance between the actual position of the device and the location of a place of interest is less than the predetermined value.

Suitably, the calendar entry matches the actual time once only or repeatedly for a specified time unit, such as day/week/month/year.

The step of updating and storing the actual position of the device may comprise receiving GPS signals.

Also, the step of updating and storing the actual position of the device may comprise receiving position information from a mobile telecommunication network.

Suitably, the mobile telecommunication network uses EOTD (Enhanced Observed Time Difference) or OTDOA (Observed Time Difference On Arrival).

BRIEF DESCRIPTION OF THE DRAWINGS

The invention will be described below with reference to the accompanying drawing, in which the only FIGURE is three views of various distances applied in the present invention.

DETAILED DESCRIPTION OF PREFERRED EMBODIMENTS

Figure 1:
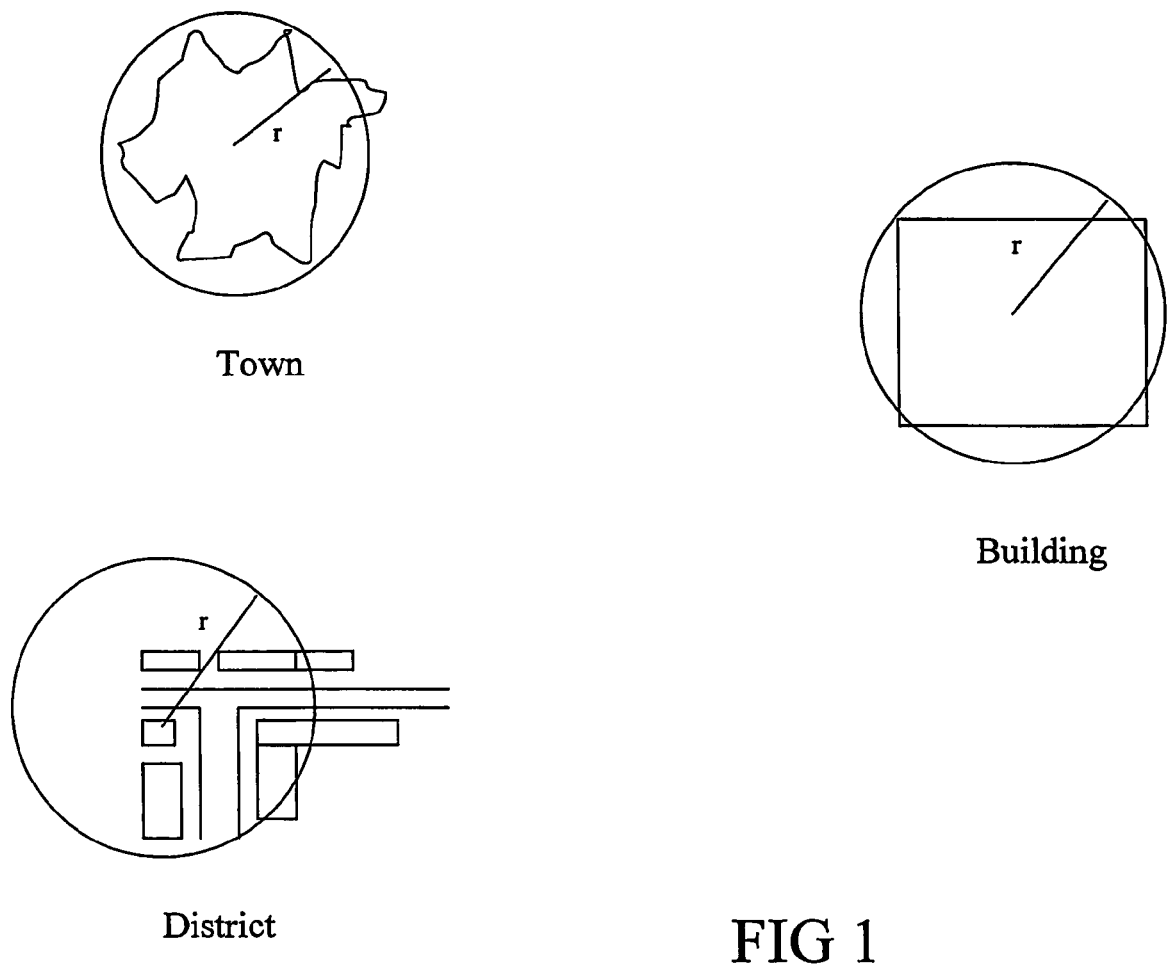

The invention will be described by means of a mobile telephone as an example. A person skilled in the art will realize that the invention is also applicable in other devices, such as pagers, communicators, smart phones, positioning devices or electronic organizers.

As is conventional, the mobile telephone software includes a time based calendar function capable of generating signals triggered when the internal clock of the phone matches the calendar entry. An alert signal can be any kind of signal, such as audible signals, visual signals and messages shown on the display of the telephone. The user enters in advance what kind of signal is requested and at what time. The calendar includes a function for generating the alert signal once only, or repeatedly, e.g. at the same time each day, each week, each month, or even each year, etc.

The device also incorporates a function for knowing its own position. Today there exist various possibilities such as GPS (Global Positioning System) based on satellites, and location/positioning services within mobile telecommunication systems using e.g. triangulation with reference to known positions of base stations. Any positioning service can be used with the present invention. In mobile systems an EOTD (Enhanced Observed Time Difference) is used within GSM (Global System for Mobile Communications) and GPRS (General Packet Radio Service) or OTDOA (Observed Time Difference On Arrival) in the third generation systems. The accuracy provided by EOTD or GPS is in most cases sufficient for the application. Below ten metres is usually not needed for the functionality contemplated in the present invention.

Thus, the actual position of a device is updated and stored in the positioning means of the device. When and how often the position is updated may depend on the movement of the device or on time or both. E.g. the position is updated every time the device has moved a distance, for instance 100 meters. Also, the update rate could be dependent of the speed of the device. If the device moves quickly, the updates are more frequent. If the device does not move at all, the position need not be updated. Also, the position can be updated every time the device changes base station in a handover. Based on time, the position can be updated at regular time intervals, such as every ten minutes or every hour, optionally dependent upon the speed of the device.

The location of places where the user wants to be reminded of things to do is also stored in the device. The positioning data for the wanted location can be supplied either by yellow pages or advertisements over the web, e.g. by means of the phone's WAP browser, or a personal map program. Such programs are usually supplied with the GPS software enabling the user himself to search the co-ordinates. Printed and other published maps can be downloaded in the device from a computer. After a while the user will have his favourite locations stored just to choose from a list—just like the phone book.

Thus, the phone's actual position can be compared with a location of a place of interest stored in the telephone. When the distance between those two positions is less than a value the phone can respond by generating an alert signal. The distance can be fixed but is preferably variable so that the user can set a limit depending on the location of the place of interest and the nature of the task.

The alert signal can be triggered based on this distance alone, but can also be conditional based on the actual time by combination with the time-based calendar. A few examples are given below with reference to FIG. 1.

In the first example the distance between the actual position of the device and the position of the place of interest is set at a rather large value r. The user may want to visit a certain shop or restaurant next time he is in a specific town. In this case the distance is set at a large value, e.g. ten kilometres, so that the whole town is included. Since the user does not visit this town very often he is not disturbed by unnecessary alarms. Also, he may not know beforehand when he will visit the town next time, so the actual time he will go there is not possible or relevant to enter. Another example is that a friend tells the user about a terrific place he has visited on his last trip, and the user wants a reminder to go there next time he is passing by this place.

Another example is when the distance is set to a lower value. It may e.g. be walking distance within a district of the user's hometown. The user may want to be reminded to visit a certain shop when he is in the vicinity but he does not want to be reminded every time he is in town. In this instance the distance r may be set at a few hundred metres.

Another example is when the distance r is set to only include a specific building, such as the user's home, place of work, the library, etc. When the user gets home he may want to be reminded to check the contents of the fridge; or when the user is visiting a friend's home he wants to be reminded to borrow a book or a record; or when the user is visiting his summer cottage he wants to be reminded to water the plants or bring home the tools he left there last time.

The above reminders can be generated each time the distance between the actual position of the device and the location of the place of interest is less than the set value r. However, in some instances the user wants only to be reminded at certain times. E.g. the user wants to be reminded to re-new the company parking ticket at the last working day of the month. In this case the user requests an alert signal to be generated when he is within the building of his place of work at the last working day of the month. He can also schedule his meetings and only be reminded when at work with a similar entry in the location-based and time-based calendar. In these cases, the alert signal is only generated when both the time and location conditions are satisfied.

The user can respond to the alert signal by a confirmation, resulting in that the calendar entry is deleted or repeated as the case may be. E.g. the alert signal can be confirmed by:

a) OK (deletion)
b) Remind me in 5 minutes (repetition), or
c) Remind me next time I come here instead (location-based repetition).

The repetition time can be set to be dependent on the distance r. For example, if r is small, such as when the reminder is triggered in a building, the repetition time is set at 10 minutes, but when r is large, such as when the reminder is triggered in a city, the repetition time is set at one hour. The presumption is that it takes longer to leave a city than a building before the postponed action is forgotten.

A person skilled in the art will realize that there are many ways to implement the invention. The form and function of the time-based and location-based calendar may vary in many respects. The scope of the invention is only limited by the claims below.

The invention claimed is:

1. A device for generating an alert signal comprising:
positioning means for updating and storing an actual position of the device, comprising:
location storage means for storing the location of a place of interest;
means for storing a request for an alert signal associated with the location of a place of interest;
first trigger means for comparing the actual position of the device with the location of the place of interest and triggering generation of said alert signal when the distance between the actual position of the device and the location of the place of interest is less than a predetermined value (r);
calendar means for storing calendar entries;
clock means for keeping track of the actual time; and
second trigger means for comparing the actual time with a calendar entry and triggering generation of said alert signal when the actual time matches the calendar entry, but only when the distance between the actual position of the device and the location of the place of interest is less than the predetermined value (r).

2. A device according to claim 1, wherein the predetermined value (r) is variable, and may be set individually for each request for an alert signal.

3. A device according to claim 1 wherein the location storage means comprises a personal map program.

4. A device according to claim 1, wherein the location storage means comprises a browser for finding locations on a telecommunications network.

5. A device according to claim 4 wherein the browser is a WAP browser for finding locations on the Internet.

6. A device according to claim 1, wherein the positioning means further is configured to update the actual position of the device every time the device changes base station.

7. A device according claim 1, wherein the positioning means further is configured to update the actual position of the device at regular time intervals and/or every time the device has moved a distance.

8. A device according to claim 1, wherein the positioning means further is configured to update the actual position of the device in dependence of the speed of the device.

9. A device according to claim 1, wherein the calendar entry matches the actual time once only.

10. A device according to claim 1, wherein the calendar entry matches the actual time repeatedly for a specified time unit.

11. A device according to claim 1, wherein the positioning means comprises a GPS receiver.

12. A device according to claim 1, wherein the device is a portable telephone, a pager, a communicator, a smart phone, a positioning device or an electronic organiser.

13. A method for generating an alert signal in a device comprising:
storing an actual position of the device;
storing the location of a place of interest;
storing a request for an alert signal associated with the location of a place of interest;
comparing the actual position of the device with the location of the place of interest and triggering generation of said alert signal when the distance between the actual position of the device and the location of the place of interest is less than a predetermined value (r);
storing calendar entries;
keeping track of the actual time; and
comparing the actual time with a calendar entry and triggering generation of said alert signal when the actual time matches the calendar entry, but only when the distance between the actual position of the device and the location of the place of interest is less than the predetermined value (r).

14. A method according to claim 13 wherein the predetermined value (r) is variable, and is set individually for each request for an alert signal.

15. A method according to claim 13 wherein storing the location of the place of interest comprises storing the location of the place of interest by means of a personal map program.

16. A method according to claim 13, wherein storing the location of the place of interest comprises storing the location of the place of interest by means of a browser for finding locations on a telecommunications network.

17. A method according to claim 16, wherein the browser is a WAP browser for finding locations on the Internet.

18. A method according to claim 13, further comprising:
updating the actual position of the device every time the device changes base station.

19. A method according to claim 13, further comprising:
updating the actual position of the device at regular time intervals and/or every time the device has moved a distance.

20. A method according to claim 13, further comprising:
updating the actual position of the device based on a speed of the device.

21. A method according to claim 13, wherein the calendar entry matches the actual time once only.

22. A method according to claim 13, wherein the calendar entry matches the actual time repeatedly for a specified time unit.

23. A method according to claim 13, wherein storing the actual position of the device comprises receiving GPS signals.

24. A method according to claim 13, wherein storing the actual position of the device comprises receiving position information from a mobile telecommunication network.

25. A method according to claim 24, wherein the mobile telecommunication network uses EOTD (Enhanced Observed Time Difference) or OTDOA (Observed Time Difference On Arrival).

26. A method according to claim 13, wherein the device is a portable telephone, a pager, a communicator, a smart phone, a positioning device or an electronic organiser.

* * * * *